INVENTOR
N. E. WICKLIFF
BY
ATTORNEY

3,434,031
REGULATED POLYPHASE RECTIFYING CIRCUITS

Noble E. Wickliff, Winston-Salem, N.C., assignor to Bell Telephone Laboratories, Incorporated, Murray Hill, N.J., a corporation of New York
Filed Sept. 19, 1966, Ser. No. 580,379
U.S. Cl. 321—5                                   5 Claims
Int. Cl. H02m 1/08, 7/44, 7/68

ABSTRACT OF THE DISCLOSURE

Integrating circuits associated with respective phases of a polyphase rectifier accumulate charges beginning when their respective phase voltage levels exceed the rectified output voltage. When the rectifier in a first phase is fired in response to an error voltage, the integrating action in that phase is halted and the accumulated charge is held. In each remaining phase, a detector fires a rectifier when the charge in its integrating circuit equals that held by the first phase integrating circuit.

---

Figure 1:
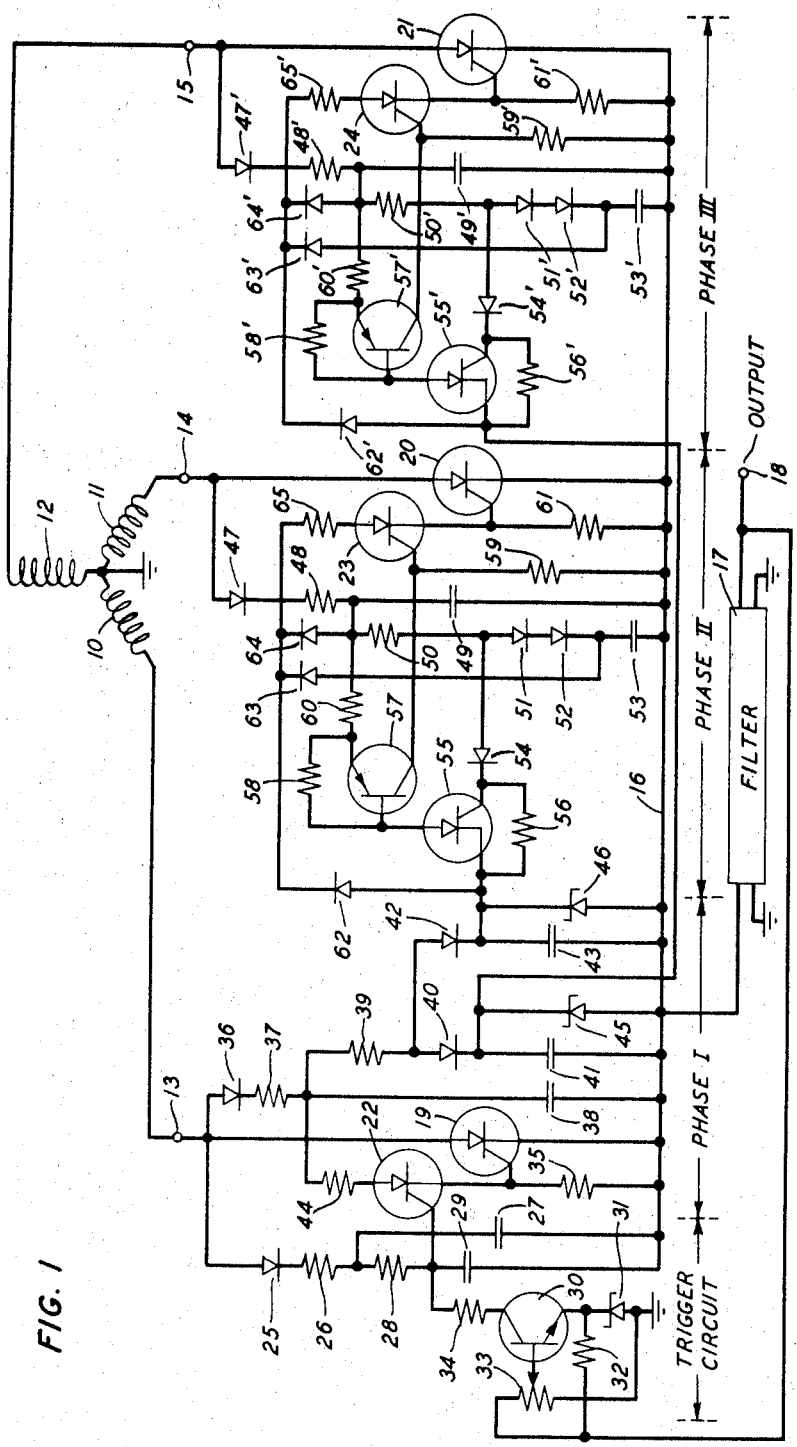

This invention relates to circuits for developing regulated rectified voltages from polyphase alternating voltages.

Polyphase rectifying circuits having an independently controlled rectifier for each phase are well known. In general, the rectifiers are fired in sequence with their firings controlled by error voltages related to the differences between desired and actual output levels. Unfortunately, the rectifiers are sometimes fired irregularly with the result that a phase-to-phase unbalance occurs, which, in turn, may produce either an overloading of a phase or a harmonically related oscillation in the output. Attempts to solve this problem have been made by using either magnetic amplifier firing circuits or unijunction firing circuits. These attempts, however, have not always been desirable or successful. Magnetic amplifier firing circuits, for example, are sometimes undesirably bulky, heavy, expensive and/or slow acting. Unijunction firing circuits, on the other hand, are difficult to balance with respect to one another because of the wide variations that occur in unijunction solid state devices. Polyphase regulated rectifying circuits that overcome the phase-to-phase unbalancing problem without introducing these other problems are obviously desirable.

An object of the present invention is to reduce the possibility of phase-to-phase unbalance in polyphase rectifying circuits without the use of magnetic amplifiers or unijunction devices.

This and other objects are achieved in a polyphase rectifying circuit by firing only one rectifier as a function of the difference between the desired and actual output levels while slaving the remaining rectifiers to fire at substantially the same relative times within their respective phases. Since rectification in direct response to an error voltage is limited to only one of the phases and rectification of each of the remaining phases is slaved to the error controlled rectification, the possibility of phase-to-phase unbalance is substantially reduced.

In several embodiments of the invention, integrating circuits associated with respective phases accumulate charges beginning when their voltage levels exceed a reference voltage level. When the rectifier in a first phase is fired in response to an error voltage, the integrating action taking place within that phase is halted and the accumulated charge is held. Detectors in the remaining phases cause rectifiers in their phases to be fired when charges in their integrating circuits equal that held by the first phase. Resetting circuitry discharges all of the integrating circuits once they have performed their intended functions. All of the rectifiers are therefore fired at substantially the same relative time within their respective phases.

Other objects and features of the invention will become apparent from a study of the following detailed descriptions of two specific embodiments.

Figure 2:
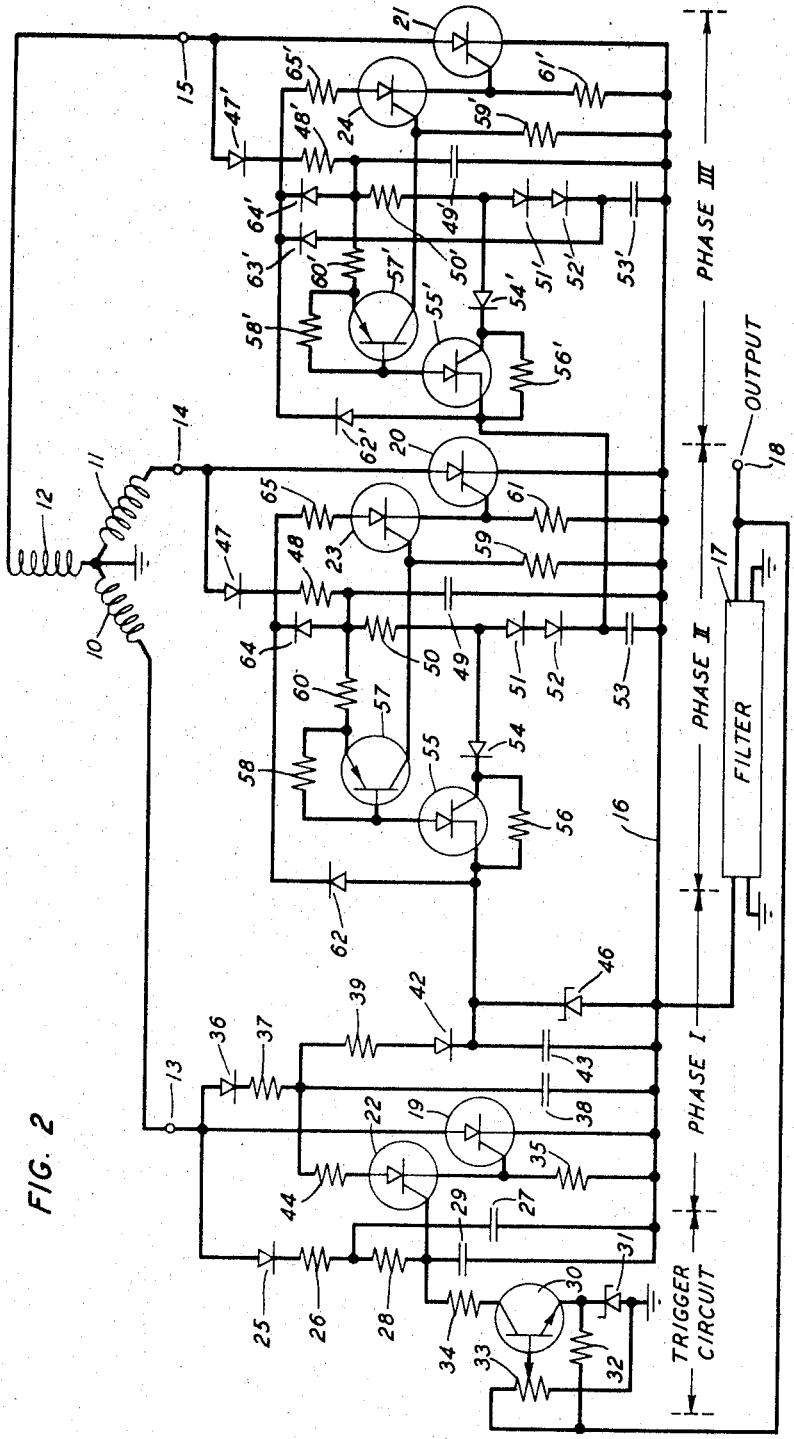

In the drawings:

FIGS. 1 and 2 are schematic diagrams of specific embodiments of the invention, respectively.

FIG. 1 shows three windings 10, 11 and 12 connected in a star configuration with their junction point grounded and their remaining extremities connected to terminals 13, 14 and 15, respectively. Alternating voltages appearing on terminals 13, 14 and 15 are rectified by circuits identified as phase I, phase II and phase III, respectively, and appear in an unfiltered form on a bus 16. The voltages on bus 16 are applied to a filter 17 whose output, in turn, appears on a terminal 18. A portion of the voltage appearing on terminal 18 is applied to a trigger circuit which applies triggering voltages to phase I circuit. The controlled rectifiers in the phase circuits are silicon contolled rectifiers 19, 20 and 21; the driver elements for firing these rectifiers are silicon controlled rectifiers 22, 23 and 24, respectively. A more detailed explanation of the circuits of FIG. 1 and their operations is now presented.

The trigger circuit includes a diode 25, a resistor 26 and a capacitor 27 connected in series in that order between terminal 13 and bus 16. Diode 25 is poled for easy current flow from terminal 13 to bus 16. Resistor 26 has a relatively small value and is present to limit the maximum current in diode 25. Capacitor 27 charges to substantially the peak positive voltage difference between terminal 13 and bus 16; after being charged to this peak voltage, the capacitor is isolated from terminal 13 as a result of diode 25 being back-biased. A serial combination comprising a resistor 28 and a capacitor 29 is connected in shunt with capacitor 27. Resistor 28 has a larger value that that of resistor 26 so that capacitor 29 does not receive its charge as rapidly as capacitor 27 because of a difference in time constants. Capacitor 29 therefore continues to charge from the charge on capacitor 27 after diode 25 is back-biased. This arrangement permits timing to be achieved beyond the time of the peak in the voltage difference between terminal 13 and bus 16.

The trigger circuit also includes a transistor 30 having a Zener diode 31 connected between its emitter and ground. A resistor 32 is connected between the emitter and terminal 18. Resistor 32 and diode 31 provide bias for the transistor. The base of the transistor is connected to the arm of a potentiometer 33 which is connected between terminal 18 and ground. Finally, a resistor 34 is connected between the collector of transistor 30 and the junction of the serial combination of resistor 28 and capacitor 29 so as to limit the maximum current through the transistor. Transistor 30 and its surrounding components provide a controlled shunting path for capacitor 29. The shunting effect thus provided varies as a function of the level of the output on terminal 18 and, furthermore, varies in a direction that tends to cause the output on terminal 18 to remain constant.

The voltage appearing at the junction of the serial combination of resistor 28 and capacitor 29 is applied to the gate of rectifier 22 of phase I circuit. The cathode of rectifier 22 is connected to bus 16 by way of a resistor 35. The cathode is also connected to the gate of rectifier 19. When the trigger circuit produces a voltage sufficient to fire rectifier 22, the voltage appearing on the cathode of rectifier 22 is sufficient to fire rectifier 19. Resistor 35 in effect lowers the gate junction impedance of rectifier 22 when it is in its nonconducting state so that the rectifier is not fired by noise.

Phase I circuit also includes a diode 36, a resistor 37 and a capacitor 38 connected in that order between terminal 13 and bus 16. A resistor 39 has one of its terminals connected to the junction between resistor 37 and capacitor 38. A series combination comprising a diode 40 and a capacitor 41 is conected between the other terminal of resistor 39 and bus 16. A similar series combination comprising a diode 42 and a capacitor 43 is also connected between this other terminal of resistor 39 and bus 16. The components 36 through 43 function in a substantially identical way to components 25 through 29 of the trigger circuit, with the exception that diodes 40 and 42 prevent capacitors 41 and 43 from discharging when capacitor 38 is discharged through a peak current limiting resistor 44 when rectifier 22 is fired.

Since capacitors 41 and 43 begin to accumulate a charge shortly after the time the voltage on terminal 13 exceeds that on bus 16 and, furthermore, this charging action is terminated when rectifiers 22 and 19 are fired, the charges appearing in capacitors 41 and 43 are functions of the interval between the time the voltage at terminal 13 exceeds that of bus 16 and the time when rectifier 19 is fired. These charges are used to trigger rectifiers 20 and 21 in the other phase circuits at substantially the same time in their phase of operation as rectifier 19 is fired in its phase of operation.

Zener diodes 45 and 46 are connected in shunt with capacitors 41 and 43, respectively. As will become apparent, these Zener diodes prevent the voltages across capacitors 41 and 43 from ever exceeding a level which would prevent rectifiers 20 and 21 from firing.

Phase II circuit includes a diode 47, a resistor 48 and a capacitor 49 connected between terminal 14 and bus 16. A series combination comprising a resistor 50, diodes 51 and 52 and a capacitor 53 is connected in shunt with capacitor 49. Components 47 through 53 perform substantially the same function as components 36 through 43 of phase I circuit, with the exception that diodes 51 and 52 are provided to produce a slight standoff voltage above that developed across capacitor 53. This standoff voltage compensates for drops across a portion of the circuit now to be described.

The junction between resistor 50 and diode 51 is connected by way of a forwardly poled diode 54 to the gate of a silicon controlled rectifier 55. Diode 54 performs an isolating function. A resistor 56 is connected between the gate and the cathode of rectifier 55. This resistor limits the reverse voltage that is applied to the gate junction of rectifier 55. The standoff voltage produced by diodes 51 and 52 compensates for the voltage necessary across the gate junction of rectifier 55 and the junction of diode 54 in order for rectifier 55 to fire. Rectifier 55 therefore fires when the voltage across capacitor 53 is substantially equal to the voltage across capacitor 43.

Connected to the anode of rectifier 55 is the base of a transistor 57. An open-base, leakage-preventing resistor 58 is connected between the emitter and the base of transistor 57. The collector of transistor 57 is connected to the gate of rectifier 23 and, furthermore, to bus 16 by way of a resistor 59. This latter resistor prevents misfiring of rectifier 23. The emitter of transistor 57 is also connected by way of a peak current limiting resistor 60 to the junction between resistors 48 and 50. In operation, emitter-to-base current flows in transistor 57 when rectifier 55 fires. This emitter-to-base current in turn causes a collector current to flow, which fires rectifier 23. When rectifier 23 fires, its cathode current causes rectifier 20 to fire. A resistor 61 is connected between the gate and the cathode of rectifier 20 to prevent misfiring of that rectifier. Referring back to the firing of rectifier 23, the rectifier draws currents from capacitors 43, 53 and 49 by way of isolating diodes 62, 63 and 64, respectively, and a current limiting resistor 65 connected in series with the anode of rectifier 23. This last-mentioned function resets the integrating circuit capacitors so that the circuitry associated with the firing of rectifier 20 is set for the next cycle.

Phase III circuit is identical to phase II circuit. The same symbols, with primes added, have therefore been used to identify all of the components of this circuit with the exception of the previously identified rectifiers 21 and 24.

To summarize, the main current rectifiers in FIG. 1 are silicon controlled rectifiers 19, 20 and 21. Rectifier 19 is fired by a silicon controlled rectifier 22, which is triggered by a trigger circuit. The trigger circuit comprises an integrator, where the rate of charge placed on the integrating capacitor is controlled by the voltage on terminal 18. In addition to firing rectifier 19, rectifier 22 also interrupts the integrating action taking place within the integrator comprising capacitors 41 and 43 so that the charges on capacitors 41 and 43 are a measure of the delay time in firing rectifier 19.

Phase II circuit also includes an integrator. It further includes an amplitude detector comprising rectifier 55 and transistor 57. This rectifying circuit detects when the level of the potential across integrator circuit capacitor 53 equals that across integrating circuit capacitor 43, and at that time triggers rectifier 23. When rectifier 23 is triggered, it causes rectifier 20 to be fired and capacitors 43, 53 and 49 to be reset.

Phase III circuit operates in a manner identical to that of phase II circuit.

From the above description, it is believed apparent that phase I circuit fires in response to the output from the trigger circuit, while phases II and III circuits are directly slaved to the firing of phase I circuit. By this slaving technique, the possibility of phase-to-phase unbalance produced when each of the phases is triggered independently as a function of the output voltage level has been reduced.

The circuit of FIG. 2 is very similar to that of FIG. 1 and consequently the same symbols have been used where applicable. The circuit of FIG. 2 distinguishes from that of FIG. 1 in that phase II circuit is directly slaved to phase I circuit while phase III circuit is slaved to phase I circuit by way of phase II circuit. This may be better appreciated by considering the following discussion.

The trigger circuit of FIG. 2 is identical to that of FIG. 1. Phase I circuit of FIG. 2 differs from that of FIG. 1 in that diode 40, capacitor 41 and Zener diode 45 have been eliminated. Phase II circuit of FIG. 2 differs from that of FIG. 1 in that diode 63 has been eliminated so that capacitor 53 is not reset when rectifier 23 is triggered. Phase III circuit of FIG. 2 differs from FIG. 1 only in that the cathode of rectifier 55' is connected to capacitor 53 of phase II circuit rather than capacitor 41 in phase I circuit of FIG. 1; capacitor 53 of FIG. 2 is thus reset along with capacitors 53' and 49' of phase III circuit.

The operation of the overall circuit of FIG. 2 is substantially identical to that of the overall circuit of FIG. 1, the only exception being that advantage is taken of the fact that the charge appearing in capacitor 53 is substantially the same as that appearing in capacitor 43. In other words, advantage is taken of the fact that these charges are substantially identical to eliminate three diodes and one capacitor.

The above-described embodiments comprise three-phase rectifying systems. It is to be understood that the invention is useful for any similar polyphase application. Furthermore, the use of silicon controlled rectifiers in explaining the operation of the invention is not meant to imply that the invention is limited to the use of silicon controlled rectifiers.

Although only two embodiments have been illustrated and described in detail, the invention may take other forms as appreciated by those skilled in the art.

What is claimed is:

1. In a circuit for developing a regulated rectified voltage from a polyphase alternating voltage by controlling the firing of normally nonconducting rectifiers associated with the phases of said polyphase voltage, respectively, firing circuitry comprising:

means connected to a first of said rectifiers to fire said first rectifier to drive said rectified voltage toward a predetermined level, and means to integrate during each cycle the voltage levels applied to said rectifiers, respectively, in excess of said rectified voltage and, furthermore, to fire each remaining rectifier each time the integrated excess level associated with it substantially equals the integrated excess level associated with said first rectifier.

2. In combination
a plurality of normally nonconducting rectifiers each having input, output and firing terminals,
a common output terminal connected to said rectifier output terminals,
a trigger circuit connected between said common output terminal and the firing terminal of a first of said rectifiers,
integrating means connected across each of said rectifiers, respectively, to produce for each rectifier at least one voltage whose level changes as a function of time when the voltage on the input terminal of that rectifier exceeds the voltage on the output terminal of the same rectifier,
means connected to the integrating means associated with said first rectifier to isolate said first rectifier integrating means in response to the firing of said first rectifier,
means connected to each of the remaining of said rectifiers to fire said remaining rectifiers when the voltages of their respective integrating means substantially equals that of said first rectifier integrating means when said first rectifier is fired, and
means to reset each of said integrating means once it has performed its function.

3. A circuit for rectifying a polyphase alternating voltage to produce a rectified voltage output, said circuit comprising
a plurality of normally nonconducting rectifiers equal in number to the number of phases of said polyphase voltage and each having an input terminal, an output terminal and a control terminal where said control terminal is for firing the rectifier,
means for applying each phase of said alternating voltage to said rectifier input terminals, respectively,
a circuit output terminal means,
means connecting said rectifier output terminals to said circuit output terminal,
means connected between said circuit output terminal and the control terminal of a first of said rectifiers to fire said first rectifier during each alternating voltage cycle to drive the level of the rectified voltage on said circuit output terminal toward a predetermined value, and
means to integrate during each cycle the voltage levels applied to said rectifiers, respectively, in excess of said rectified voltage and, furthermore, to fire each remaining rectifier each time the integrated excess level associated with it substantially equals the integrated excess level associated with said first rectifier.

4. A combination in accordance with claim 3 in which the last mentioned means comprises:

integrating means connected to said first rectifier to produce, during each cycle of the phase applied thereto, a plurality of voltages equal in number to said remaining rectifiers,
integrating means connected to said remaining rectifiers, respectively, to produce voltages during each cycle of their respective phases, and
means connected to each of said remaining rectifiers, respectively, to fire said remaining rectifiers when the levels of their voltages are substantially equal to those of said first rectifier, respectively.

5. A combination in accordance with claim 3 in which the last mentioned means comprises:

integrating means connected to said first rectifier to produce a voltage during each cycle of the phase applied thereto,
integrating means connected to said remaining rectifiers to produce voltages during each cycle of their respective phases, and
means connected to each of said remaining rectifiers, respectively, to fire each of said remaining rectifiers when the level of the voltage associated with it is substantially equal to that associated with the previously fired rectifier.

References Cited

UNITED STATES PATENTS

| | | | |
|---|---|---|---|
| 3,114,098 | 12/1963 | Rallo et al. | 321—47 |
| 3,273,043 | 9/1966 | Clarke et al. | 321—18 |
| 3,273,045 | 9/1966 | Benson | 321—18 XR |
| 3,304,486 | 2/1967 | Michaels | 321—18 |
| 3,360,709 | 12/1967 | Etter | 321—5 |

JOHN F. COUCH, *Primary Examiner.*

W. SHOOP, *Assistant Examiner.*

U.S. Cl. X.R.

321—18, 47; 307—252